April 1, 1969     J. K. HALLENBURG     3,435,629
BOREHOLE LOGGING TECHNIQUE
Filed April 13, 1967
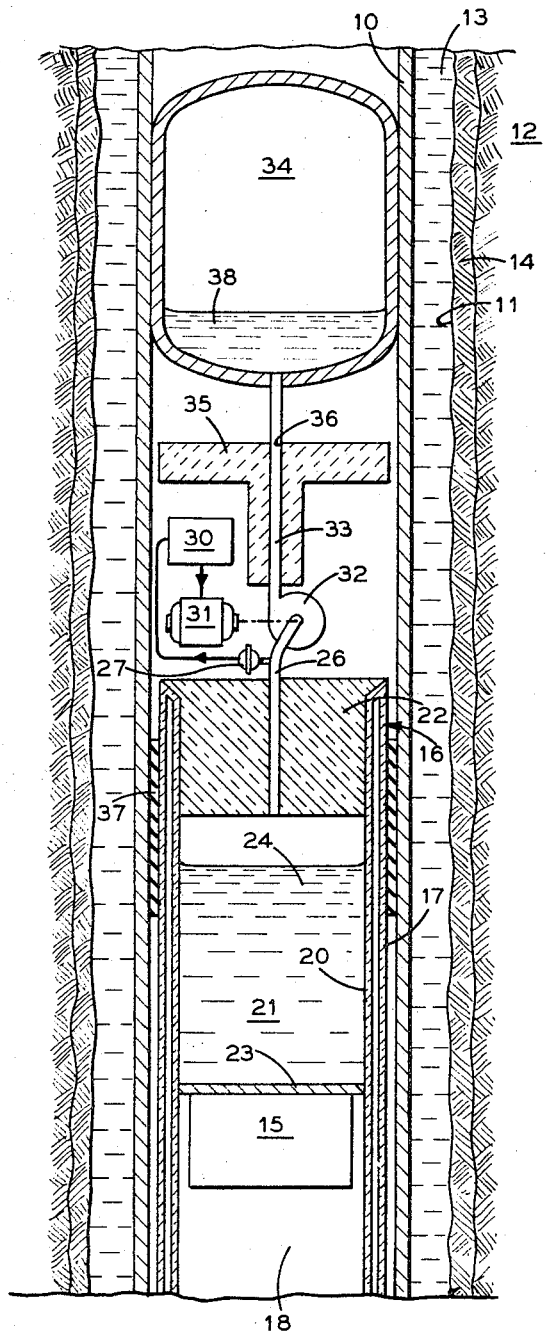
INVENTOR.
James K. Hallenburg
BY John P. Sinnott
ATTORNEY United States Patent Office 3,435,629
Patented Apr. 1, 1969

3,435,629
BOREHOLE LOGGING TECHNIQUE
James K. Hallenburg, Fort Worth, Tex., assignor to Schlumberger Technology Corporation, Houston, Tex., a corporation of Texas
Filed Apr. 13, 1967, Ser. No. 630,665
Int. Cl. F25d 23/12; F25b 19/00; H01j 39/18
U.S. Cl. 62—259   6 Claims

ABSTRACT OF THE DISCLOSURE

One embodiment of this invention stabilizes the temperature of electrical equipment enclosed in a Dewar flask within a well logging tool at a substantially lower value than the ambient borehole temperature. Cooling water in an evaporator which also is in the Dewar flask, absorbs heat at constant pressure from the electrical equipment. Water vapor from the evaporator is pumped to a higher pressure and discharged into a condenser that is in thermal equilibrium with the borehole. The higher pressure in the condenser causes the vapor to return to a liquid state in order to liberate the heat of vaporization that was absorbed in the evaporator. This heat then is transferred by the condenser to the borehole environment.

BACKGROUND OF THE INVENTION

Field of the invention

This invention relates to apparatus for cooling various instruments, and has particular reference to cooling such instruments in borehole logging tools and the like.

Description of the prior art

In order to identify oil bearing formations, it usually is necessary to log these formations with tools or sondes that are drawn through a borehole. These tools measure formation characteristics that indicate the presence of oil within the surrounding formations. Necessarily, these measurements frequently require reliable operation of delicate electrical equipment within the tool.

Because the boreholes usually are of small diameter, miniature electrical components, such as transistors and integrated circuits, are used in order to produce tool diameters that are compatible with the borehole. Electrical apparatus of this character generates substantial amounts of heat. This heat must be dissipated by some means compatible with reasonable tool sizes, because apparatus of this sort is extremely temperature sensitive and will not function reliably if the temperature fluctuates through a wide range, or stabilizes at a very high value.

This heat disposal problem is aggravated in borehole logging equipment inasmuch as borehole temperatures increase with depth, and reach a maximum at about 260° C. Temperatures in this range present difficult noise and stability problems in electrical circuit design, which are best overcome by operating the equipment at a constant temperature substantially below this range.

Proposals have been advanced to encase the equipment within a Dewar flask or a Thermos bottle inside the logging tool. Although these proposals protect the equipment to a limited extent from the ambient temperature of the borehole, they fail to cope with the heat generated within the flask by the encased equipment.

Further suggestions have sought to overcome this latter difficulty by evaporative cooling, in which water vapor emitted from an evaporator encasing the electrical equipment is piped to a chemical absorbent. In this manner the absorbed vapor carries heat away from the equipment as the heat of vaporization. This proposal, however, is based on an irreversible chemical process. The absorbent must be replaced often, and the end product of the reaction frequently is a corrosive residue, such as calcium hydroxide.

Accordingly, it is an object of the invention to provide an improved apparatus for cooling electrical equipment to a constant temperature in a higher, variable temperature environment.

It is a further object of the invention to provide an improved device for cooling borehole logging tools.

It is still another object of the invention to provide an improved evaporative cooling mechanism for a borehole logging tool.

SUMMARY

In accordance with the invention, an evaporator containing a working substance, such as water, is encased in a Dewar flask within a well logging tool. The flask also houses electrical equipment that is in thermal contact with the evaporator. In response to the equipment heat absorbed by the evaporator, the water vaporizes, or forms steam. By keeping the vapor pressure within the evaporator at a constant value, however, the water temperature and the equipment temperature reach an equilibrium commensurate with the established evaporator pressure. A pump in fluid communication with the evaporator maintains a constant vapor pressure by pumping some of the vapor into a higher pressure condenser within the tool. Although the condenser is in thermal equilibrium with borehole temperature that is higher than the equipment temperature, the increased vapor pressure within the condenser nevertheless causes the water to liquify. Much of the heat generated by the electrical equipment, which was removed from the evaporator as the heat of vaporization, then is liberated by the condensing vapor and is discharged through the condenser to the borehole.

Thus, by manipulating the evaporator and condenser pressures in accordance with the invention, downhole electrical equipment can be temperature stabilized at acceptable preselected values. Consequently, the need for chemically active vapor absorbents, and the like, is overcome by the present invention.

For a better understanding of the invention, together with other and further objects thereof, reference is had to the following description taken in connection with the accompanying drawing, the scope of the invention being pointed out in the appended claims.

BRIEF DESCRIPTION OF THE DRAWING

The sole figure of the drawing is a schematic diagram of a portion of a borehole logging tool in full section, in which one embodiment of the invention is illustrated.

DESCRIPTION OF THE PREFERRED EMBODIMENTS

An illustrative embodiment of a practical apparatus for cooling downhole electrical equipment is shown in the drawing.

Accordingly, the tool comprises a fluid-tight pressure resistant housing 10 adapted to pass through a borehole 11 that traverses earth formation 12. The borehole 11 is filled with water-base drilling mud 13, as shown. The housing 10 is suspended in the borehole 11 by a cable (not shown) that may contain a group of insulated conductors for transmitting electrical signals to the earth's surface. A winch (also not shown) located at the surface of the earth is used to lower and raise the housing in the borehole to traverse the earth formation 12.

The boreohle 11 may be lined with a mudcake 14 which usually forms in uncased boreholes when liquids in the drilling mud invade or seep into the earth formations 12 surrounding the borehole 11 and deposit a residue of solid matter on the borehole walls.

Characteristics of the formation 12 may be measured, for example, by irradiating the formation with neutrons or gamma rays from a source (not shown). Neutrons or gamma rays so emitted traverse the formation 12, and some are scattered back to the housing 10. Backscattered radiations of this sort bear information that identifies important features of the formation 12. A radiation detector (also not shown) registers some of these radiations and produces a signal which must be transmitted to the earth's surface to permit the oil-bearing potential of the formation 12 to be analyzed.

Necessarily, correct evaluation of the transmitted signals depends largely on the reliable operation of downhole electrical apparatus 15, such as power supplies, pulse height discriminators, amplifiers, scaling circuits and signal transmission circuits. The heat generated by the earth formation 12 and the operation of the electrical apparatus 15, however, unless dissipated, degrades the quality of the transmitted signals through thermal noise and circuit instability.

Accordingly, electrical apparatus 15 is protected, at least in part, from the ambient borehole temperature by a Dewar flask 16. The flask 16 has an outer wall 17 and an inner wall 20 which may be silvered to reflect radiant heat away from the interior 18 of the flask 16. The space between the outer wall 17 and the inner wall 20 is evacuated in order to reduce conductive heat transfer between the housing 10 and the flask interior 18.

In accordance with the invention, heat absorbed from the borehole 11, and heat generated through the operation of the electrical apparatus 15 is removed from the flask interior 18 by an evaporator 21. The evaporator 21 is comprised of a thermally non-conductive stopper 22 that closes the open upper end of the Dewar flask 16. The evaporator 21 further comprises the upper portion of the inner wall 20 of the flask 16 and a lower, fluid-tight partition 23 formed of a thermally conductive material, such as copper or silver, that is disposed transversely across the flask interior 18. Other alternative embodiments of the evaporator 21 comprise, for example, an evaporator coil in the flask interior 18 or an annular cylinder interposed between the inner wall 20 of the Dewar flask 16 and the electrical apparatus 15.

The evaporator 21 contains a working substance, such as cooling water 24, that absorbs heat transferred through the partition 23 from the electrical apparatus 15. Illustratively, if the temperature of the electrical apparatus 15 is to be stabilized at 100° C., the temperature of the water 24 in the evaporator 21 must not exceed this value in order to enable heat to flow from the apparatus 15 across the partition 23 to the water 24.

In accordance with the invention, precise evaporator temperatures are provided by controlling the vapor or steam pressure within the evaporator. Thus, for an applied pressure of 1 atmosphere (760 mm. Hg), water within the evaporator 21 will boil at 100° C. The heat generated by the electrical apparatus 15 is absorbed by the evaporator 21 as the heat required to vaporize the water at the specific evaporator pressure. During this constant pressure evaporation process, the water temperature also remains constant. By selectively increasing or reducing the steam pressure within the evaporator, the boiling temperature (and hence the approximate temperature of the electrical apparatus 15) is raised or lowered, respectively, to a predetermined value in accordance with the known properties of water. Thus, for example, at an evaporator pressure of 526 mm. Hg, the water 24 will boil at a constant temperature of 90° C.

As shown in the drawing, the pressure in the evaporator 24 is regulated by a pressure sensor 27 within the housing 10 that is positioned outside the Dewar flask 16, but in fluid communication with the evaporator 24 through a conduit 26 that traverses the stopper 22. The pressure sensor 27 responds to the increased evaporator pressure by activating a downhole motor control 30, which, in turn, energizes a motor 31 within the housing 10. The motor 31 drives a pump 32 that is located above the stopper 22 in order to draw vapor from the conduit 26 and discharge this vapor at a higher pressure and a higher temperature through an outlet conduit 33 to a connecting condenser 34.

When the pump 32 has reduced the pressure in the evaporator 24 to a value that will establish the desired evaporator temperature, the pressure sensor 27 deactivates the control 30 in order to stop the pump 32 by de-energizing the motor 31.

The condenser 34, which may be a pressure resistant steel tank, is in thermal contact with the housing 10 in order to establish an equilibrium temperature between the interior of the tank 34 and the borehole environment. Borehole temperatures of about 260° C. are common, and, for example, if the condenser temperature is 260° C., the vapor or steam pressure within the condenser 34 ought to be about 5 atmospheres, or 680 lbs./sq. in. (p.s.i.), in order to insure that the steam discharged by the pump 32 will return to the liqiud state within the condenser 34. Thus, the vapor discharged from the pump 32 has a pressure of about 5 atmospheres and a temperature substantially higher than 260° C. As the vapor cools down to 260° C., it liberates the heat of vaporization and forms a liquid condensate 38. The liberated heat of vaporization, moreover, is dissipated to the borehole 11 through the walls of the condenser 34 and the housing 10.

Accordingly, one aspect of the invention provides for heat absorption at a constant pressure and heat dissipation at a constant pressure and a variable borehole temperature, after the cooling system has reached a status of thermal equilibrium.

In order to improve the thermal isolation between the flask 16 and the condenser 34, a transverse block 25 of thermal insulating material is interposed between the condenser 34 and the pump 32. The block 25, moreover, has a centrally disposed longitudinal passageway 36 to accommodate the conduit 33.

An annular, resilient support 37 is placed snugly between the outer wall 17 of the flask 16 and the inner surface of the housing 10 to isolate the flask from shocks and the like during handling and tool operation.

A thermal analysis of one embodiment of the invention illustratively characterizes the features of the downhole cooling system. Thus, if it is assumed, for example, that the ambient temperature of the borehole is 260° C. and the water temperature in the evaporator 21 is 100° C., then $\Delta t = 160°$ C. If the heat absorbed by the flask 16 from the borehole 11 is 74 cal hr.$^{-1}$ C.$^{-1}$, the total borehole heat absorbed at $\Delta T = 160°$ C. is 11,800 cal hr.$^{-1}$. At 100° C., the heat of water vaporization is 540 cal. g.$^{-1}$. Thus, $$\frac{11800}{540} \text{ g.hr.}^{-1} = 22 \text{ g.hr.}^{-1}$$

Consequently, 22 grams of water must be vaporized in each hour to absorb the heat flowing through the walls of the flask 16 from the borehole. Further, if it is assumed that the heat generated by the electrical apparatus 15 is 10 watts, or 8600 cal hr.$^{-1}$, the vaporizing water required to absorb this much heat is $$\frac{8600}{540} \text{ g.hr.}^{-1} = 16 \text{ g.hr.}^{-1}$$

The total water vaporization required in each hour to stabilize the equipment temperature at 100° C. then must be about 38 grams. Accordingly, vaporizing 1 liter of water in these circumstances will keep the temperature of the apparatus 15 at 100° C. for 26 hours.

Because the specific volume of water vapor at 100° C. is 1700 cc. g.$^{-1}$, the pump 32 must be able to draw about 1 liter per minute of steam from the evaporator 21. In order to enable the steam to condense at 260° C., the pump 32 must increase the steam pressure to 680 p.s.i.

Consequently, if the condenser 34 has a volume of 1 liter, a condenser pressure resistance of 1000 p.s.i. (internal) would provide a safe design.

Continuing with the heat balance analysis, the heat of vaporization is approximately 500 cal. g.$^{-1}$ at 260° C. Consequently, the pump 32 must add:

$$500 \text{ cal g.}^{-1} \times 38 \text{ g. hr.}^{-1} = 19{,}000 \text{ cal hr.}^{-1}$$

Or, in terms of pumping power, if 860 cal hr.$^{-1}$=1 watt, the pump 32 must deliver 22 watts to the steam from the evaporator 21 in order to increase the steam pressure to 5 atmospheres and thereby cool the flask interior 18. For a typical pump efficiency of 30% and motor efficiency of 70%, the input power requirement for the motor 31 is about 110 watts to accomplish the necessary cooling.

Clearly, the pump 32 can be replaced by any suitable means for doing work on the vapor in order to increase the steam pressure from the evaporator pressure to a proper value for liquifaction within the condenser 34 at all reasonably expected borehole temperatures.

After the formation 12 is logged, the housing 10 is withdrawn from the borehole 11 and the condenser 34 is allowed to cool to atmospheric temperature. The condenser 34 is drained, and the evaporator 21 is refilled with the cooling water 24 in any suitable manner. For instance, the pump 32 could be reversed after the water 38 cools, or the water could be discarded and fresh water poured into the evaporator 21.

Water is used as a working substance to illustrate the principles of the invention. Other coolants also may be used with satisfactory results. The only limitation on coolant choice imposed by the invention is that the coolant must absorb heat during a change from one state to another and liberate a substantial amount of this absorbed heat on returning at a higher temperature to the initial state. The Dewar flask 16 is also shown for illustrative purposes; other suitable insulating vessels can be substituted for the flask with an effect equal to that which is described herein.

While particular embodiments of the present invention have been shown and described, it is apparent that changes and modifications may be made without departing from this invention in its broader aspects, and, therefore, the aim in the appended claims is to cover all such changes and modifications as fall within the true spirit and scope of this invention.

What is claimed is:

1. A heat transfer system for a borehole logging tool comprising an evaporator within the tool for absorbing the heat, a condenser within the tool in thermal communication with the borehole for dissipating the heat absorbed in said evaporater, and pump means within the tool in fluid comunication with said evaporator and said condenser to maintain approximately constant but different respective pressures therein in order to transfer heat from said evaporator to the borehole through said condenser.

2. A heat transfer system in accordance with claim 1 comprising pressure sensor means in fluid communication with said evaporator for controlling said pump means in response thereto.

3. A cooling system for a borehole logging tool comprising an evaporator thermally isolated from the tool, a working substance within the evaporator, a condenser within the tool and in communication therewith, conduit means interconnecting said evaporator and said condenser for establishing working substance flow between said evaporator and said condenser, and pump means in fluid communication with said conduit means for transferring said working substance exclusively from said evaporator to said condenser during logging tool cooling.

4. A cooling system according to claim 3 wherein said working substance comprises water.

5. An evaporative cooling system for a borehole logging tool comprising a tool housing, an evaporator within said housing in substantial thermal isolation therefrom, electrical apparatus within said housing in thermal communication with said evaporator, a condenser within said housing in thermal communication therewith, a vapor conduit interconnecting said evaporator and said condenser to transfer vapor exclusively from said evaporator to said condenser during logging tool cooling, a working substance within said evaporator for vaporization in response to heat from said electrical apparatus, a compressor in communication with said vapor conduit for drawing vapor during tool cooling exclusively from said evaporator and discharging said vapor to said condenser at a substantially higher pressure, and pressure sensing means in communication with said evaporator for controlling said compressor operation.

6. A borehole logging tool comprising a housing, a Dewar flask within said housing, electrical apparatus encased in said Dewar flask, an evaporator within said Dewar flask and in thermal communication with said electrical apparatus, a liquid working substance within said evaporator for vaporization in response to said thermal communication, a condenser in thermal communication with the borehole and said housing, a pump for transferring said working substance vapor exclusively from said evaporator to said condenser during logging in order to establish a vapor pressure within said condenser for liquifaction of said working fluid therein at the borehole temperature, and pressure sensing means for energizing said pump.

References Cited

UNITED STATES PATENTS

| | | | |
|---|---|---|---|
| 2,106,591 | 1/1938 | Briggeman | 62—227 |
| 2,189,122 | 2/1940 | Andrews | 62—514 X |
| 2,521,294 | 9/1950 | Jackson | 62—259 |
| 2,671,323 | 3/1954 | Richert | 62—259 |
| 2,714,169 | 7/1955 | Armistead | 62—514 X |
| 2,782,318 | 2/1957 | Herzog | 250—71.5 |
| 3,038,074 | 6/1962 | Scherbatskoy | 250—71.5 |
| 3,112,890 | 12/1963 | Snelling | 62—119 |
| 3,167,653 | 1/1965 | Rumble | 250—71.5 |

WILLIAM J. WYE, *Primary Examiner.*

U.S. Cl. X.R.

62—119, 514; 250—71.5